(12) United States Patent
Gans

(10) Patent No.: US 8,137,854 B2
(45) Date of Patent: Mar. 20, 2012

(54) FUEL CELL SYSTEM AS A PRIMARY ELECTRICAL ENERGY SUPPLY FOR AIRCRAFT

(75) Inventor: Hubert Gans, Pujaudran (FR)

(73) Assignee: Airbus Operations GmbH (DE)

( * ) Notice: Subject to any disclaimer, the term of this patent is extended or adjusted under 35 U.S.C. 154(b) by 1318 days.

(21) Appl. No.: 11/225,650

(22) Filed: Sep. 13, 2005

(65) Prior Publication Data

US 2006/0138278 A1    Jun. 29, 2006

Related U.S. Application Data

(60) Provisional application No. 60/609,968, filed on Sep. 15, 2004.

(30) Foreign Application Priority Data

Sep. 15, 2004  (DE) .......................... 10 2004 044 646

(51) Int. Cl.
*H01M 8/24* (2006.01)
*H01M 8/04* (2006.01)
*B64D 41/00* (2006.01)

(52) U.S. Cl. ........ 429/428; 429/433; 429/452; 429/471; 244/58

(58) Field of Classification Search .................. None
See application file for complete search history.

(56) References Cited

U.S. PATENT DOCUMENTS

| 3,786,696 A | 1/1974 | Aleem |
| 4,330,743 A | 5/1982 | Glennon |
| 5,936,318 A | 8/1999 | Weiler et al. |
| 6,296,957 B1 | 10/2001 | Graage |
| 6,450,447 B1 | 9/2002 | Konrad et al. |
| 2003/0230671 A1* | 12/2003 | Dunn .......................... 244/53 R |

FOREIGN PATENT DOCUMENTS

| DD | 2343839 | 3/1974 |
| DE | 31 26 149 A1 | 4/1982 |

(Continued)

OTHER PUBLICATIONS

Walker, James et al., Emerging fuel cell teachnology being developed—Offers many benefits to air vehicles, Online, Aug. 10, 2004, XP002360349 NASA Glenn Research Center, Research/Technology Report URL: http://www.grc.nasangov/WWW/RT.2003/20/00/2600walker.html.*

(Continued)

*Primary Examiner* — Barbara Gilliam
*Assistant Examiner* — Angela Martin
(74) *Attorney, Agent, or Firm* — Lerner, David, Littenberg, Krumholz & Mentlik, LLP

(57) ABSTRACT

Apart from electrical energy, nowadays the main engines also supply pneumatic and hydraulic energy to the aircraft, using corresponding media. Apart from mechanical disadvantages this results in reduced engine efficiency in relation to thrust, fuel consumption and weight. According to an embodiment of the present invention an energy supply system for aircraft is provided, comprising a fuel cell arrangement and an electrical energy distribution device. In this way it is possible to replace all the energy generating systems of the engines, which provide energy for the aircraft systems, except for the starter generator, as a result of which the efficiency of the individual engines is improved. Furthermore, the efficiency of onboard energy generation is improved, which in the final analysis results in reduced fuel consumption.

9 Claims, 3 Drawing Sheets

FOREIGN PATENT DOCUMENTS

| | | |
|---|---|---|
| DE | 198 21 952 C2 | 7/2000 |
| DE | 199 11 018 C1 | 8/2000 |
| DE | 196 17 915 C2 | 11/2001 |
| WO | WO 2004/037641 * | 5/2004 |
| WO | WO-2004/037641 A2 | 5/2004 |

OTHER PUBLICATIONS

Walker, James F.; Civinskas, Kestutis C.: "Emerging Fuel Cell Technology Being Developed—Offers Many Benefits to Air Vehicles"[Online] Aug. 10, 2004. XP002360349 NASA Glenn Research Center Research/Technology Report Gefunden im Internet: <URL:http://www.grc.nasa.gov/WWW/RT/2003/2000/2600Walker.html>.

Liang, Anita: "Emerging Fuel Cell Developments at NASA for Aircraft Applications"[Online] Jun. 19, 2004, XPOO2360350 NASA Glenn Research Center Presentation Gefunden im Internet: URL:http://www. netl.doe.gov/publications/proceedings/03/secalAnita Liang.pdf.

Elbuluk M. E., et al: "Potential Starter/Generator Technologies for Future Aerospace Applications" Proceedings of the IEEE 1996 National Aerospace and Electronics Conference (NAECON). Dayton, May 20-23, 1996, Proceedings of the IEEE National Aerospace and Electronics Conference (NAECON), New York, IEEE, US, Bd. vol. 1, 20 (May 20, 1996).

Weimer J A Ed—Institute of Electrical and Electronics Engineers: "Electrial Power Technology for the More Electric Aircraft" Proceedings of the AIAA/IEEE Digital Avionics Systems Conference. New York, Oct. 25-28, 1993, New York, IEEE, US, Bd. Conf. 12, Oct. 25, 1993.

* cited by examiner

FUEL CELL SYSTEM AS A PRIMARY ELECTRICAL ENERGY SUPPLY FOR AIRCRAFT

CROSS-REFERENCE TO RELATED APPLICATIONS

This application claims the benefit of the filing date of U.S. Provisional Patent Application No. 60/609,968 filed Sep. 15, 2004, the disclosure of which is hereby incorporated herein by reference.

BACKGROUND OF THE INVENTION

In modern aircraft, various types of energy transmission are used for supplying aircraft systems. Apart from electrical energy, the main engines also supply pneumatic and hydraulic energy to the aircraft, using corresponding media. As a rule, the auxiliary power unit supplies pneumatic and electrical energy for starting the engines and for operating the aircraft both on the ground and in the event of an emergency.

The hydraulic and the bleed air systems, which extend along large stretches through the aircraft, are associated with a host of disadvantages. Bleed air systems require considerable construction expenditure, e.g. for operating the pneumatic valves and intermediate cooling devices. In such arrangements the maintenance effort on the engine and in the aircraft is considerable. The efficiency of the cabin air conditioning systems, which are operated with bleed air, is low. The hydraulic systems of the aircraft require considerable maintenance effort.

The energy required for operating (future) fully-electrical onboard systems can be provided by several generators driven by the engine. However, as a rule these additional generators cause the device carrier to be exposed to correspondingly heavy mechanical loads. As an alternative to installation on a device carrier, the engine generators can be directly coupled to the engine shafts. However, both concepts result in a heavy and inefficient engine that is difficult to regulate and furthermore is not easy to maintain.

There may be a need to state improved energy generation on board aircraft.

SUMMARY OF THE INVENTION

The present invention relates to the energy supply for aircraft. In particular the present invention relates to an energy supply system on board an aircraft, an aircraft comprising a corresponding energy supply system, and the use of a corresponding energy supply system in an aircraft.

According to an exemplary embodiment of the present invention, as stated in claim 1, an energy supply system on board an aircraft is provided, which energy supply system comprises a fuel cell arrangement and an electrical energy distribution device, wherein the fuel cell arrangement comprises at least one fuel cell module. In this design the fuel cell arrangement serves to provide electrical energy to the electrical energy distribution device, wherein the electrical energy distribution device is designed to distribute the provided energy to electrical consumers, and wherein the aircraft is a fully-electrical aircraft with a starter generator for each engine without there being any further main engine generators.

By integrating fuel cells in the onboard energy supply system, it may for example possible to increase the efficiency of onboard energy generation and thus in the final analysis to reduce in-flight fuel consumption. The fuel cells may supply direct current directly, to high-voltage direct-current systems. The fuel cell system may have lower pollutant emissions than a comparable auxiliary power unit and may also generate considerably less noise.

Furthermore, in this way the maintenance expenditure relating to the main engines may be reduced, as may be the weight of the main engines. Due to the absence of any main engine generators both the efficiency and the by-pass ratio may be increased.

According to a further exemplary embodiment of the present invention, as stated in claim 2, the energy supply system further comprises a regulating unit, wherein the regulating unit is connected to the electrical energy distribution device by way of a first signal line, and wherein the regulating unit is designed to control or regulate the electrical energy distribution device by way of the first signal line.

This may advantageously provide a possibility for individually regulating or controlling the energy, supply to the respective electrical consumers which are connected to the electrical energy supply device so that central energy management may be implemented.

According to a further exemplary embodiment of the present invention, as stated in claim 3, the regulating unit comprises a prioritising means, wherein the prioritising means is designed to prepare a list of rankings of the electrical consumers. In this arrangement the regulating unit may be designed to control or regulate the electrical energy distribution device by way of the first signal distance such that the available energy can be distributed to the electrical consumers according to the list of rankings of the electrical consumers.

In this way optimisation of the energy management may become possible such that high-priority consumers may in every case be supplied with sufficient electrical energy, while in the case of any supply bottleneck only less important consumers, i.e. consumers which are placed lower in the list of rankings, may receive an inadequate quantity of energy. Consequently, even in the case of a temporary shortfall in the supply of energy to the entire network, adequate energy supply to prioritised consumers may still be ensured.

According to a further exemplary embodiment of the present invention, as stated in claim 4, the electrical energy distribution device is designed to transfer signals to the control unit, wherein the regulating unit is connected to the at least one fuel cell module by way of a second signal line, and wherein the regulating unit controls or regulates the at least one fuel cell module by way of the second signal line.

In this way an onboard energy supply system may be advantageously stated which comprises an energy distribution device which can communicate with the corresponding regulating unit. For example, the signals transmitted can be information relating to the future energy requirements of a particular consumer. As a reaction to it, the regulating unit may for example further increase the output, or may reduce the output, of the at least one fuel cell module.

According to a further exemplary embodiment of the present invention, as stated in claim 5, the energy supply system further comprises a starter generator, wherein the starter generator is designed to generate energy, and wherein the starter generator is designed to feed the energy it generates, at least in part, to the electrical energy distribution device.

The energy distribution device may thus advantageously also be supplied with electrical energy if none of the fuel cell modules are operating. Furthermore, peaks in energy requirements that cannot be covered by the fuel cell modules may be covered by the starter generator energy.

According to a further exemplary embodiment of the present invention, as stated in claim 6, the starter generator is integrated on the shaft of a core engine so that there is no need for a device carrier.

In this way the requirements relating to the statics of the primary structure of the aircraft may advantageously be reduced. Furthermore, by not having a device carrier the overall weight of the aircraft may be significantly reduced.

According to a further exemplary embodiment of the present invention, as stated in claim 7, the electrical consumers are selected from the group comprising the electrical cabin air conditioning system, the electrical wing de-icing system, and the electrical pod de-icing system.

Further exemplary embodiments of the present invention are stated in the further claims.

Below, the invention is described in detail by means of exemplary embodiments with reference to the figures.

In the following description of the figures, the same reference signs are used for identical or similar elements.

DETAILED DESCRIPTION

Figure 1:
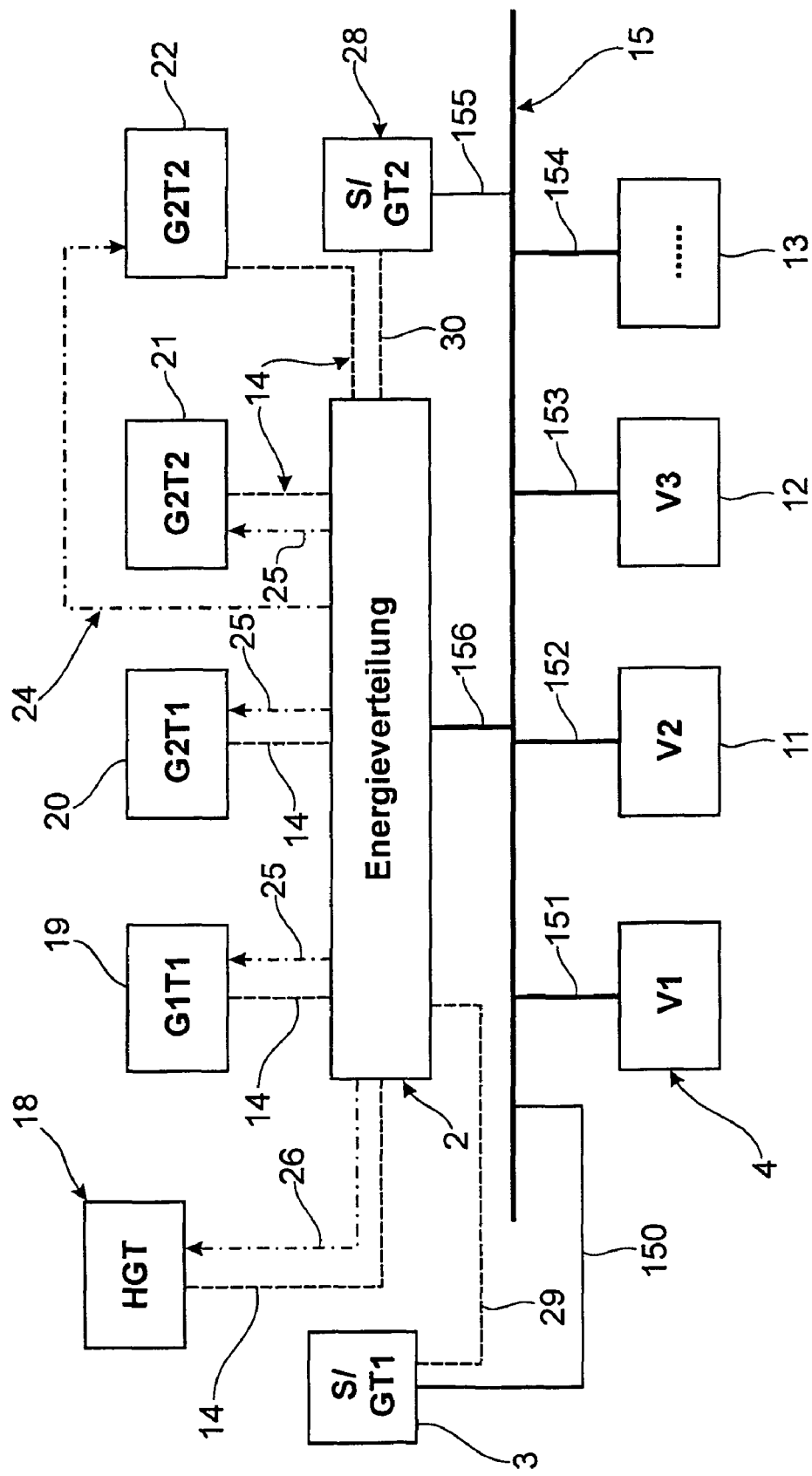
FIG. 1 shows an electrical energy supply for aircraft with generators driven by the engines.

FIG. 1 shows a diagrammatic view of an electrical energy supply system for aircraft with generators which are driven by the engines. In this arrangement the energy supply substantially comprises an electrical onboard supply system 15, an energy distribution device 2 and electrical generators of the electrical generators 19 to 22 of the engine. In this arrangement the electrical generators 19 to 22 are driven by way of the engine and generate electrical energy which they supply to the energy distribution device 2 by way of the supply lines 14. The engine generators 19 and 20 are the first and the second engine generator of the first engine. The engine generators 21, 22 are the first and the second generator of the second engine (the engines are not shown in FIG. 1). Furthermore, an auxiliary power unit 18 is connected to the energy distribution device 2 by way of the supply line 14. The four engine generators 19 to 22 and the auxiliary power unit 18 are connected to the energy distribution device 2 by way of corresponding signal lines 25, 26, 24 and can thus be selected by the energy distribution device 2.

Furthermore, the energy supply system comprises a first starter generator 3 and a second starter generator 28 which are connected to the electrical onboard supply system 15 by way of consumer connections 150, 155. Both starter generators 3, 28 can provide energy to the energy distribution device 2 by way of energy distribution lines 29, 30.

Furthermore, electrical consumers 4, 11, 12, 13 are connected to the onboard supply system 15 by way of consumer connections 151, 152, 153, 154. In this arrangement energy is supplied to the onboard supply system by way of the energy distribution device 2 and the corresponding connection 156.

Figure 2:
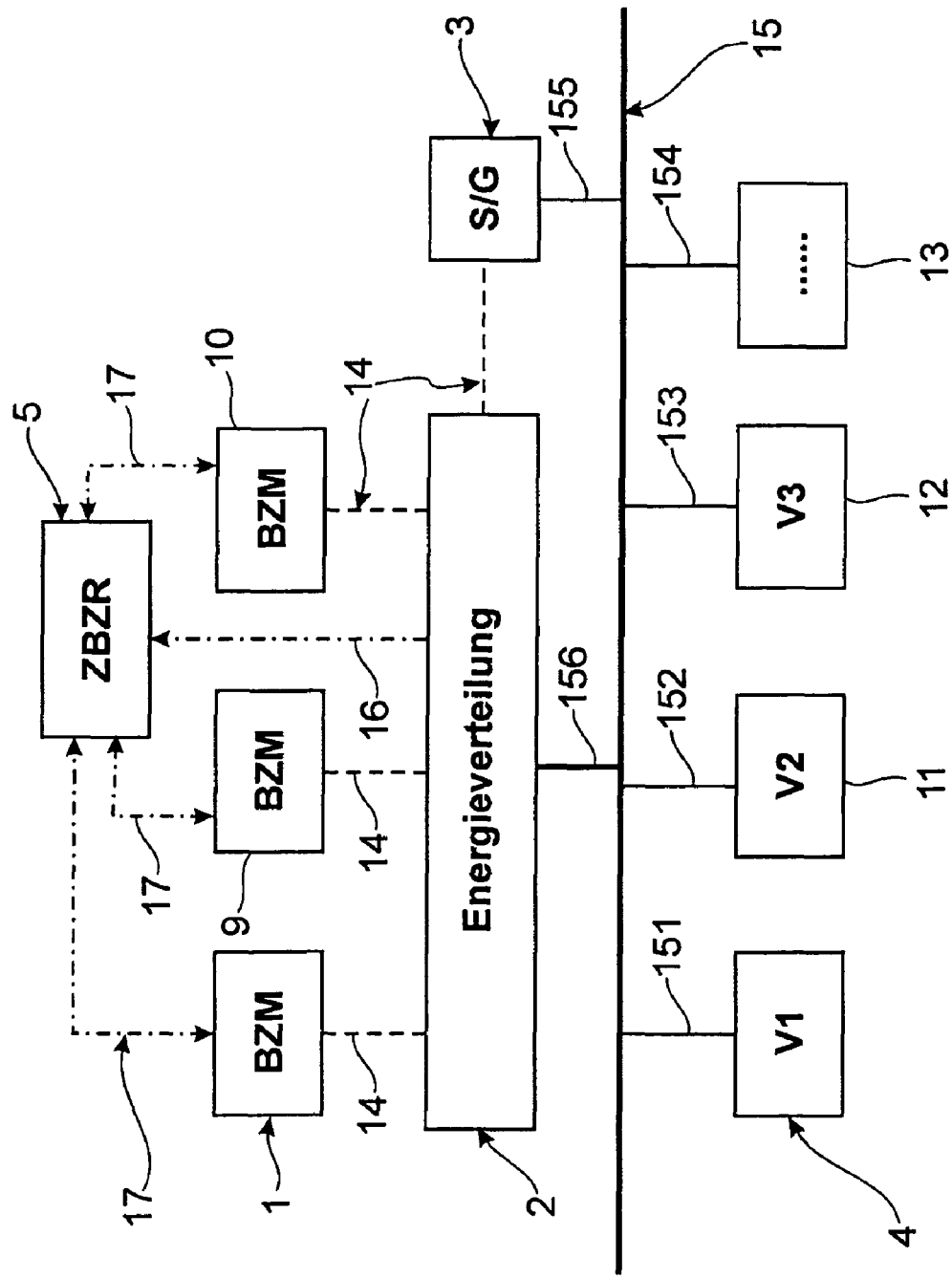
FIG. 2 shows a fuel cell system as a primary electrical energy supply for aircraft, according to an embodiment of the present invention.

FIG. 2 diagrammatically shows an energy supply system with a fuel cell system as a primary electrical energy supply for aircraft, according to an embodiment of the present invention. In this arrangement the energy supply system essentially comprises an electrical onboard supply system 15, an electrical energy distribution device 2 and a fuel cell arrangement 1, 9, 10. Furthermore, the energy supply system comprises a central fuel cell regulation device 5.

In this arrangement the central fuel cell regulation device 5 is connected to the individual fuel cell modules 1, 9, 10 by way of second signal lines 17 and can thus individually select or regulate the fuel cell modules 1, 9, 10.

Furthermore, the regulating unit 5 is connected to the electrical energy distribution device 2 by way of a first signal line 16 so that the control unit 5 can select or regulate the energy distribution unit 2 correspondingly. Furthermore, information exchange between the energy distribution device 2 and the regulating unit 5 can take place, which information exchange for example comprises information relating to the expected future energy consumption of individual consumers 4, 11, 12, 13. It is thus, for example, possible for the central control unit 5 to counter energy consumption peaks that are expected in the future by correspondingly increasing the output of individual fuel cell modules 1, 9, 10, or, if the energy consumption expected in the future is lower, it is possible for the central control unit 5 to correspondingly reduce the output. In this way, the energy supply on board the aircraft is ensured with a high level of probability. If the energy consumption is low, the output of the fuel cell modules 1, 9, 10 can be correspondingly reduced, which leads to effective raw material savings.

Of course, as far as ensuring the supply on board the aircraft is concerned, it is possible to design individual components so that they are redundant. For example, several central supply units 5 can be provided, which are for example accommodated at various locations in the aircraft so that the possibility of system failure is minimised.

Furthermore, it is possible to provide an oversupply of individual fuel cell modules 1, 9, 10 so that even excessive energy consumption can always be met, even in the case where individual fuel cell modules were to fail.

Moreover, the energy supply system comprises a starter generator 3 which is connected to the onboard supply system 15 by way of the consumer connection 155. Furthermore, the starter generator 3 is connected to the energy distribution device 2 by way of the electrical supply line 14. In this way it is possible, on the one hand, for the starter generator 3 to provide energy to the energy distribution device 2, should it, for example, not be possible for unforeseen energy consumption peaks to be covered by the fuel cell modules 1, 9, 10 alone; and it is possible on the other hand for the starter generator 3 to be supplied from the electrical onboard supply system 15, for example during engine start.

The electrical onboard supply system 15 is supplied with electrical energy by energy distribution device 2, via connection 156, and supplies the corresponding consumers 4, 11, 12, 13 by way of consumer connections 151-154. These consumers can for example be an electrical cabin air conditioning system, electrical wing de-icing system or an electrical pod de-icing system. Moreover, energy can be supplied to an engine or an engine system of the aircraft by way of the energy distribution device 2 and the electrical onboard supply system 15 or directly by way of individual fuel cell modules 1, 9, 10 (not shown in FIG. 2).

Furthermore, the central regulating unit 5 comprises a so-called prioritising means (not shown in FIG. 2). Using these, prioritising means, for example in communication with the energy distribution device 2 and the individual fuel cell modules 1, 9, 10, a list of rankings of the electrical consumers 4, 11, 12, 13 can be established. In this arrangement the list of rankings determines the energy supply priority of the individual consumers 4, 11, 12, 13. For example in the case of any energy supply shortfall, the energy supply to the consumer with the lowest priority (for example a film projector for entertaining passengers) can be terminated. In contrast to this, energy is preferentially supplied to higher-priority consumers according to the list of rankings so that adequate energy-supply to them is ensured even in emergencies.

Figure 3:
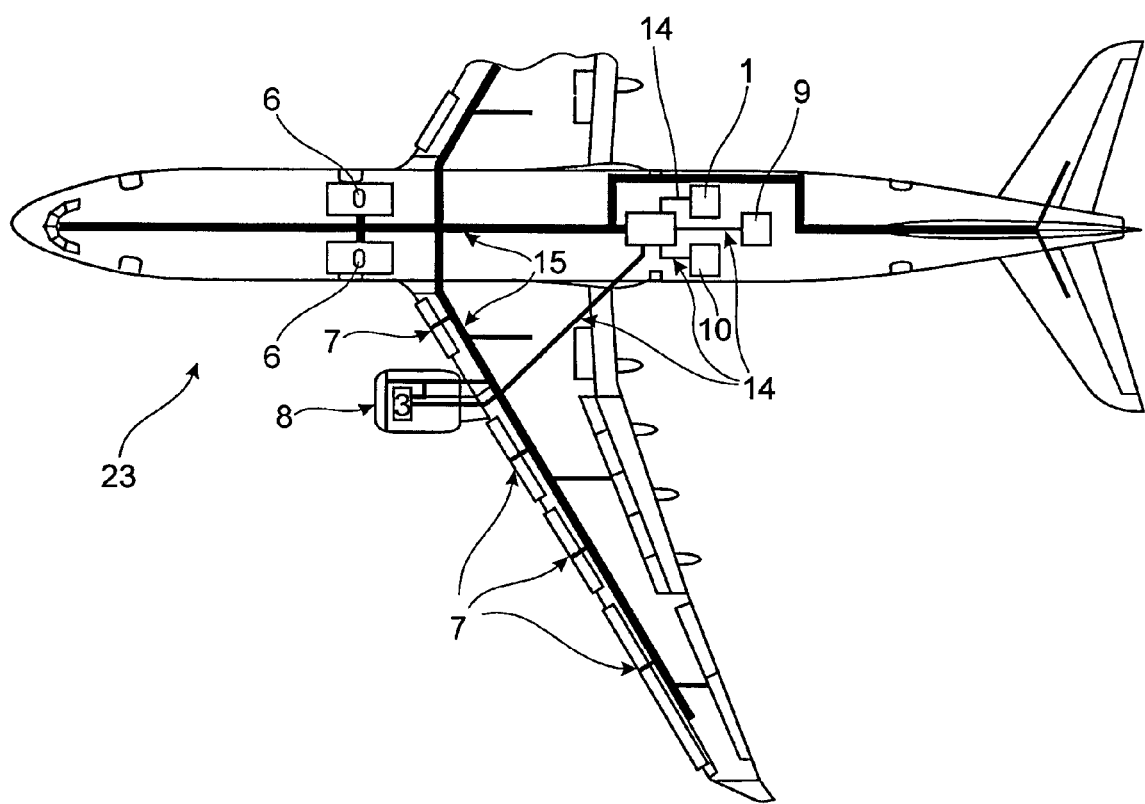
FIG. 3 shows the installation of a fuel cell system in an aircraft with fully electrical onboard systems according to one embodiment of the present invention.

FIG. 3 diagrammatically shows the installation of an energy supply system comprising various fuel cell modules as a primary electrical energy supply in an aircraft with fully electrical onboard systems according to an embodiment of the present invention. As shown in FIG. 3, the aircraft 23 comprises several fuel cell modules 1, 9, 10, an electrical energy distribution device 2, an electrical onboard supply system 15 and supply lines 14 for the energy distribution device 2.

The electrical aircraft systems such as for example the electrical cabin air conditioning system 6, the electrical wing de-icing system 7, the electrical pod de-icing system 8 and the starter generator 3 of the engine, or the individual engines or engine systems are primarily supplied by the energy supply system according to the invention. In this arrangement, energy is supplied to the electrical onboard supply system 15 by way of the electrical energy distribution device 2, which is connected to the fuel cell modules 1, 9, 10 by way of supply lines 14.

The fuel cell modules 1, 9, 10, which together with the regulating unit 5 form a fuel cell system, are the primary energy generators. Furthermore, by means of the starter generators 3 of the engines, additional electrical energy can be supplied in flight to the electrical energy distribution system 2. A fuel cell regulating unit 5 receives signals from the energy distribution device 2 and regulates the fuel cell modules 1, 9, 10. The number and position of the fuel cell modules 1, 9, 10, regulators, onboard supply systems, supply lines and energy distributors shown are not significant in the context of the invention; instead, said number and position can be determined in accordance with the desired operational safety against failure and in accordance with other criteria.

According to an embodiment of the present invention the energy distribution device regulates the provision of energy depending on the importance of the individual energy consumers (not shown in FIG. 3). Examples of electrical consumers are the cabin air conditioning system including maintaining pressure, the wing and pod de-icing systems 7, 8 as well as the starter generator 3. For the sake of clarity of overview, no other electrical onboard systems are shown in FIG. 3.

The aircraft shown in FIG. 3 can for example be a fully electrical aircraft with a starter generator 3 without further main engine generators. In this arrangement the starter generator 3 is integrated on a shaft of the core engine so that there is no need for a device carrier.

Different types of fuel cells have different efficiencies. These efficiencies are better than the electrical efficiency that can be achieved with auxiliary power units according to the state of the art. As a rule the electrical efficiency of the fuel cell modules 1, 9, 10 is better than that of engine generators. With efficient energy generation according to the invention, by means of fuel cells in conjunction with more efficient electrical onboard systems, in-flight fuel consumption can be reduced. This means that the invention makes it possible to combine all the advantages of fully electrical onboard systems (uniformity, simple electrical lines, high efficiency, serviceability, reliability) with reduced fuel consumption. Fuel cells can supply direct current directly to high-voltage direct-current systems.

The fuel cell system has lower pollutant emissions than a comparable auxiliary power unit and generates considerably less noise.

According to the invention, the engines are of a considerably simpler design and can generate thrust more efficiently. There are considerably fewer interfaces between the engines and the aircraft. Engine control is simplified and no longer needs to take into account the energy requirements of the aircraft systems. There is no longer a need for a device carrier if the starter generator 3 is integrated on the shaft of the core engine.

If for example engines with magnetic shaft bearing arrangements are used, the associated increased energy consumption can be covered by the energy supply system according to the invention.

With the use of an energy supply system-according to an embodiment of the present invention the service expenditure of the entire aircraft can be significantly reduced.

Implementation of the invention is not limited to the preferred embodiments shown in the figures. Instead, a multitude of variants are imaginable which use the solution shown and the principle according to the invention even in the case of fundamentally different embodiments.

In addition it should be pointed out that "comprising" does not exclude other elements or steps, and "a" or "one" does not exclude a plural number. Furthermore, it should be pointed out that characteristics or steps which have been described with reference to one of the above embodiments can also be used in combination with other characteristics or steps of other embodiments described above. Reference signs in the claims are not to be interpreted as limitations.

The invention claimed is:

1. A primary energy supply system on board an aircraft, comprising:
    a fuel cell arrangement;
    an electrical energy distribution device; and
    a regulating unit;
    wherein the fuel cell arrangement comprises a plurality of fuel cell modules;
    the fuel cell arrangement being configured to provide electrical energy to the electrical energy distribution device;
    the electrical energy distribution device being configured to distribute the electrical energy supplied by the fuel cell arrangement directly to electrical consumers;
    wherein the regulating unit is connected to the electrical energy distribution device by way of a first signal line and the regulating unit is connected to at least one of the plurality of fuel cell modules by way of a second signal line;
    wherein the electrical energy distribution device is configured for transmitting signals to the regulating unit relating to an expected future energy requirement of a particular electrical consumer;
    wherein the regulating unit controls or regulates the electrical energy distribution device by way of the first signal line according to a list of rankings of the electrical consumers;
    wherein the regulating unit is configured to control or regulate the plurality of fuel cell modules by way of the second signal line according to the expected future energy requirements of the particular electrical consumer; and
    wherein the aircraft is a fully-electrical aircraft with a starter generator for each engine, without there being any further main engine generators.

2. The primary energy supply system of claim 1,
wherein the regulating unit comprises a prioritising means designed to prepare the list of rankings of the electrical consumers; and
wherein the regulating unit is designed to control or regulate the electrical energy distribution device by way of the first signal line such that the available energy can be distributed to the electrical consumers according to the list of rankings of the electrical consumers.

3. The primary energy supply system according to claim 1, further comprising:
a starter generator designed to generate energy, and to feed the energy it generates, at least in part, to the electrical energy distribution device.

4. The primary energy supply system of claim 3,
wherein the starter generator is integrated on the shaft of a core engine so that there is no need for a device carrier.

5. The primary energy supply system according to claim 1,
wherein the electrical consumers are selected from the group comprising the electrical cabin air conditioning system, the electrical wing de-icing system, and the electrical pod de-icing system.

6. The primary energy supply system according to claim 1,
wherein the electrical energy distribution device or the fuel cell arrangement is designed such that by means of them energy can be supplied to an engine or to an engine system of the aircraft.

7. An aircraft comprising the primary energy supply system according to claim 1.

8. The use of the primary energy supply system according to claim 1 in an aircraft.

9. The primary energy supply of claim 1, wherein the regulating unit is enabled to counter energy consumption peaks that are expected in the future by correspondingly increasing the output of each fuel cell module of the plurality of fuel cell modules.

\* \* \* \* \*